(12) United States Patent
Alecu

(10) Patent No.: US 12,168,526 B2
(45) Date of Patent: *Dec. 17, 2024

(54) ASSIST SYSTEM AND METHOD FOR AIRCRAFT GROUND OPERATION

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/239,790

(22) Filed: Aug. 30, 2023

(65) Prior Publication Data

US 2023/0406540 A1 Dec. 21, 2023

Related U.S. Application Data

(63) Continuation of application No. 17/332,162, filed on May 27, 2021, now Pat. No. 11,772,820.

(51) Int. Cl.
*B64F 1/36* (2024.01)
*B60L 50/30* (2019.01)
(Continued)

(52) U.S. Cl.
CPC .............. *B64F 1/364* (2013.01); *B60L 50/30* (2019.02); *B60L 50/60* (2019.02); *B64C 25/00* (2013.01); *B64F 1/10* (2013.01); *B60L 2200/00* (2013.01)

(58) Field of Classification Search
CPC ......... B64C 25/34; B64C 25/66; B64C 25/50; B64C 25/405; B64C 25/32; B64C 25/00;
(Continued)

(56) References Cited

U.S. PATENT DOCUMENTS 2,366,892 A * 1/1945 Donnellan ................ B64F 1/10
280/423.1
2,567,954 A * 9/1951 Liebmann ................ B64F 1/06
244/63

(Continued)

FOREIGN PATENT DOCUMENTS

GB 482057 A 3/1938

OTHER PUBLICATIONS

European Patent Office, Communication re. extended European search report for European patent application No. 22175440, Sep. 27, 2022.

*Primary Examiner* — Justin M Benedik
(74) *Attorney, Agent, or Firm* — Norton Rose Fulbright Canada LLP

(57) ABSTRACT

An aircraft assist system described herein includes an aircraft coupling counterpart attached to a strut of a landing gear of an aircraft, and an assist vehicle. The assist vehicle includes a frame, ground-engaging wheels mounted to the frame, a power source for driving one or more of the ground-engaging wheels, and a vehicle coupling counterpart for engagement with the aircraft coupling counterpart. The aircraft coupling counterpart and the vehicle coupling counterpart define a swivel connection for transferring a propulsive force from the takeoff assist vehicle to the aircraft. The aircraft coupling counterpart is disengageable from the vehicle coupling counterpart by upward movement of the aircraft coupling counterpart relative to the vehicle coupling counterpart.

19 Claims, 9 Drawing Sheets

(51) Int. Cl.
 *B60L 50/60* (2019.01)
 *B64C 25/00* (2006.01)
 *B64F 1/10* (2006.01)

(58) Field of Classification Search
 CPC .. B64F 1/364; B64F 1/10; B60L 50/30; B60L 50/60; B60L 2200/00
 See application file for complete search history.

(56) References Cited

U.S. PATENT DOCUMENTS

| | | | |
|---|---|---|---|
| 5,511,926 | A | 4/1996 | Iles |
| 6,305,484 | B1 | 10/2001 | Leblanc |
| 8,788,117 | B2 | 7/2014 | Frings et al. |
| 9,199,745 | B2 | 12/2015 | Braier et al. |
| 10,124,911 | B2 | 11/2018 | Rheaume et al. |
| 10,569,904 | B2 | 2/2020 | Halsey et al. |
| 11,084,602 | B2 * | 8/2021 | Casado-Montero ..... B64D 5/00 |
| 2011/0127366 | A1 | 6/2011 | Becker |
| 2019/0077520 | A1 * | 3/2019 | Rosenberg .............. B64C 25/08 |
| 2019/0161209 | A1 * | 5/2019 | Casado-Montero .... B64C 25/08 |
| 2021/0107683 | A1 * | 4/2021 | Van Deventer ......... B64F 1/228 |
| 2022/0055769 | A1 * | 2/2022 | Oujamaa .................. B64F 1/10 |

\* cited by examiner

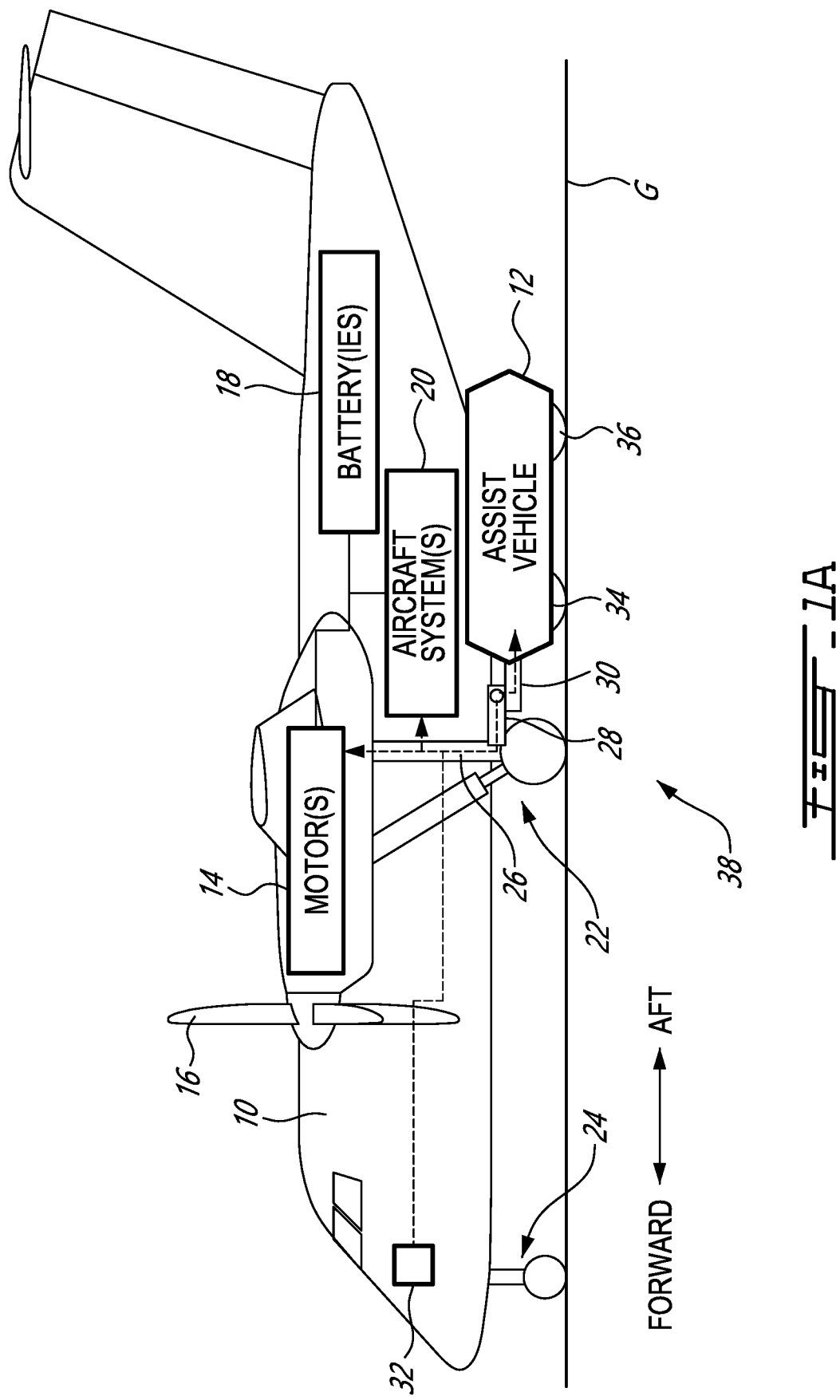

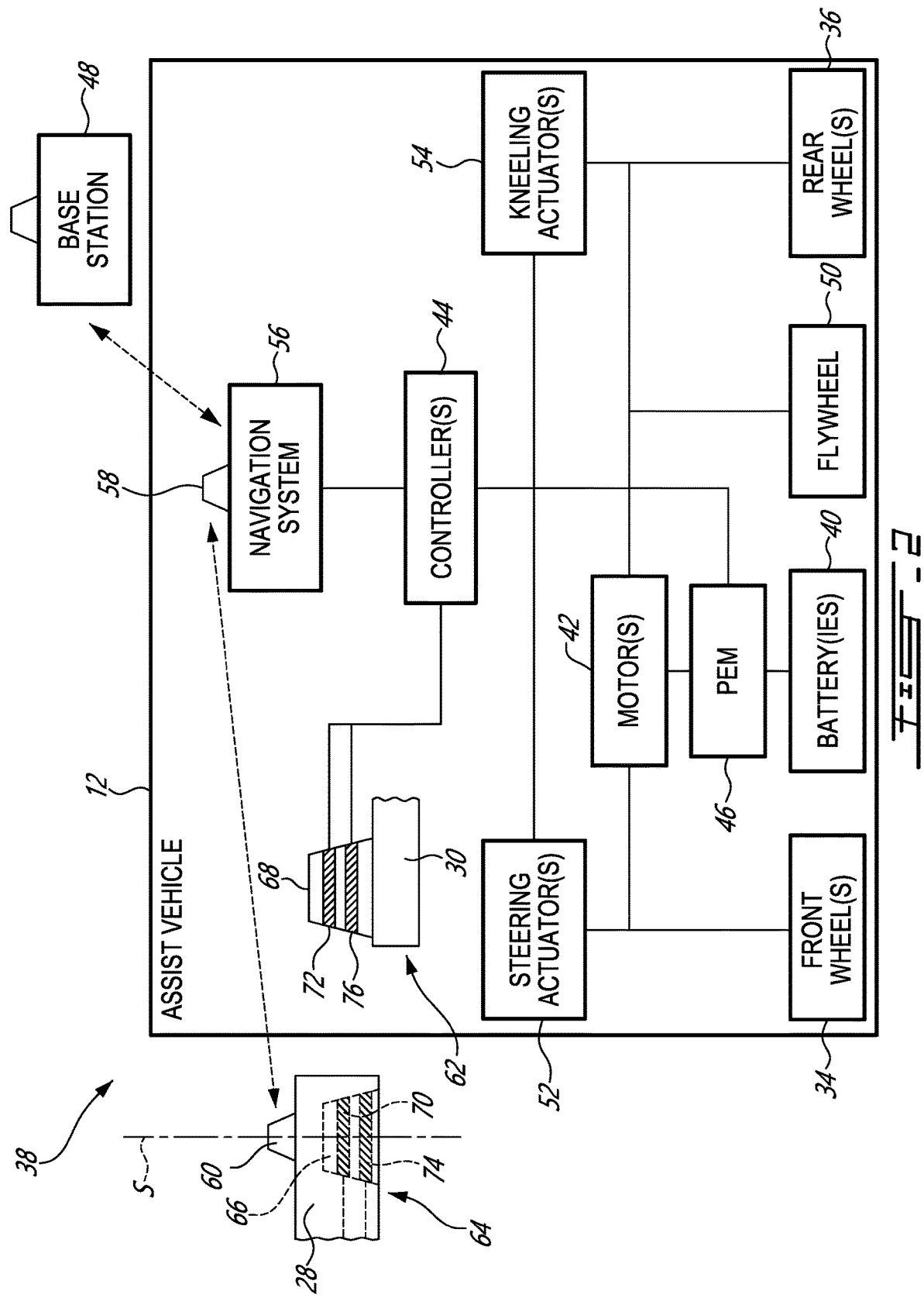

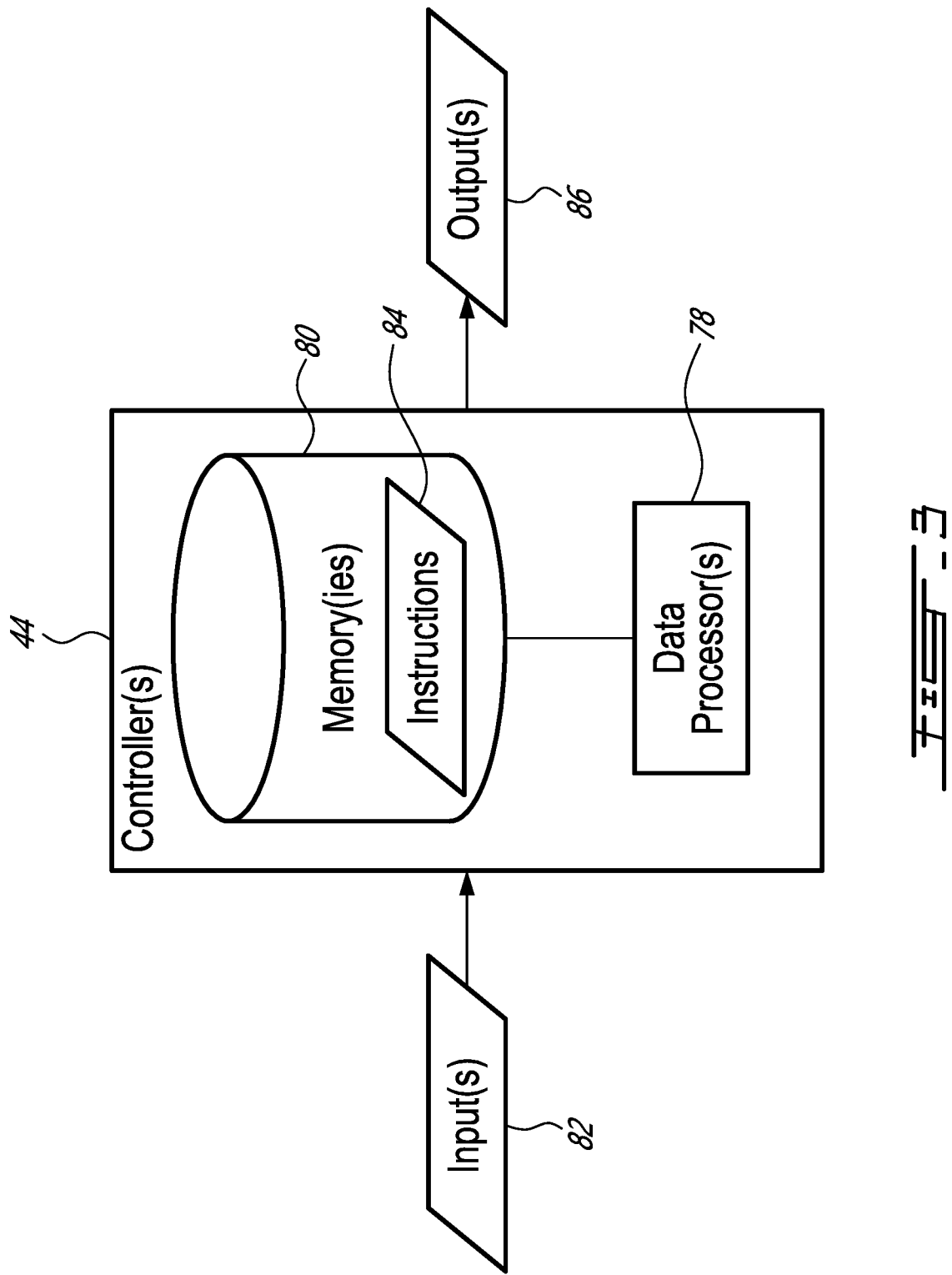

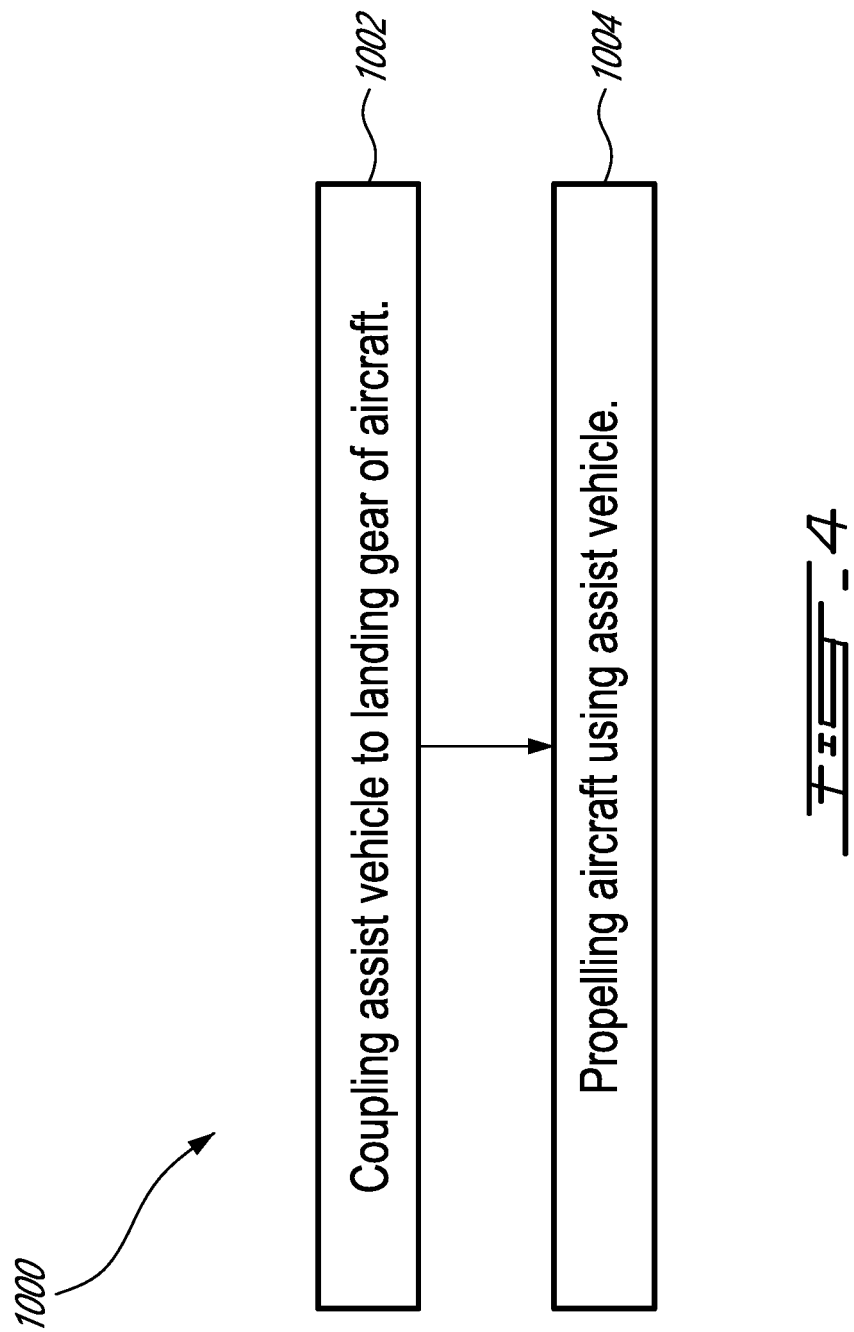

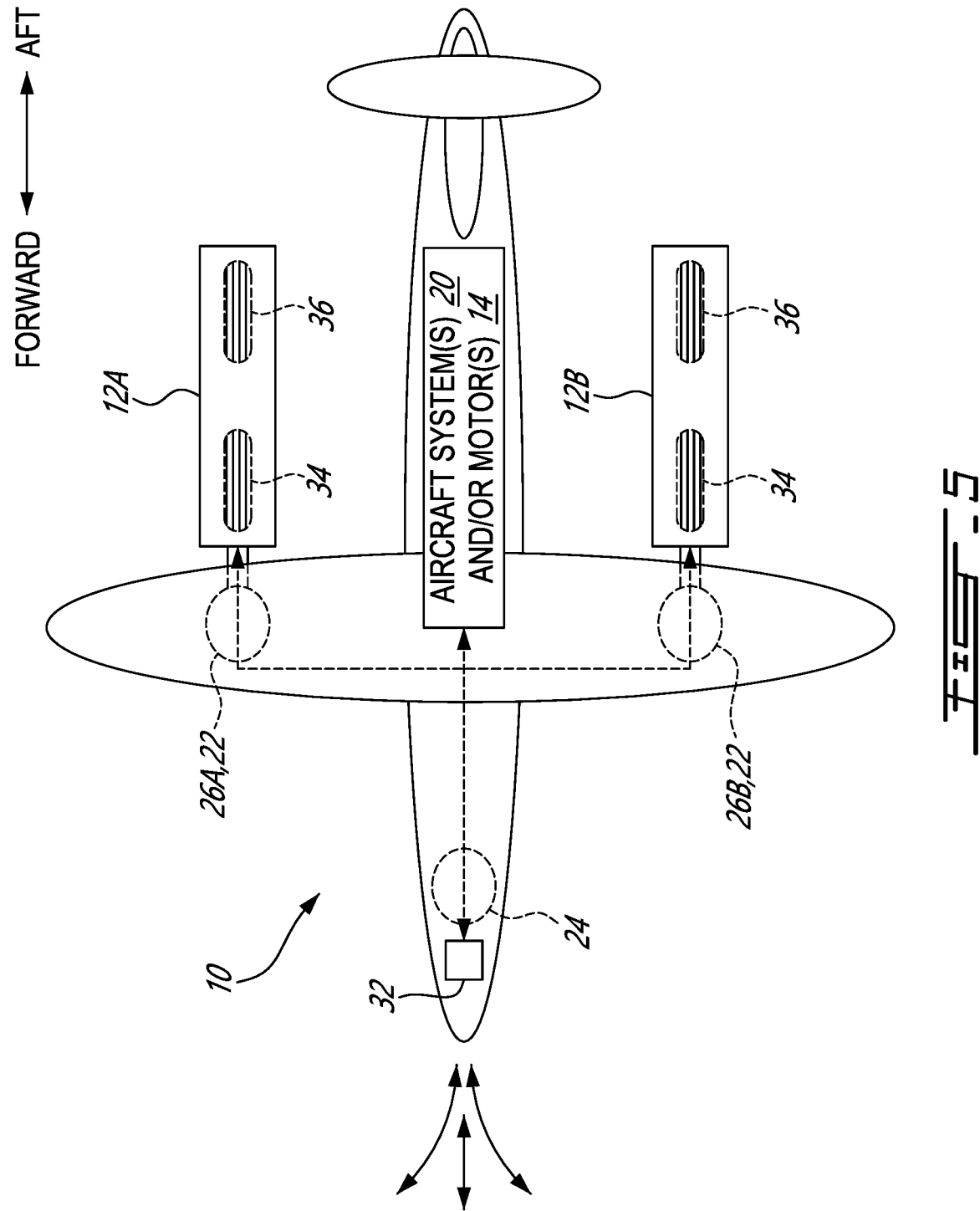

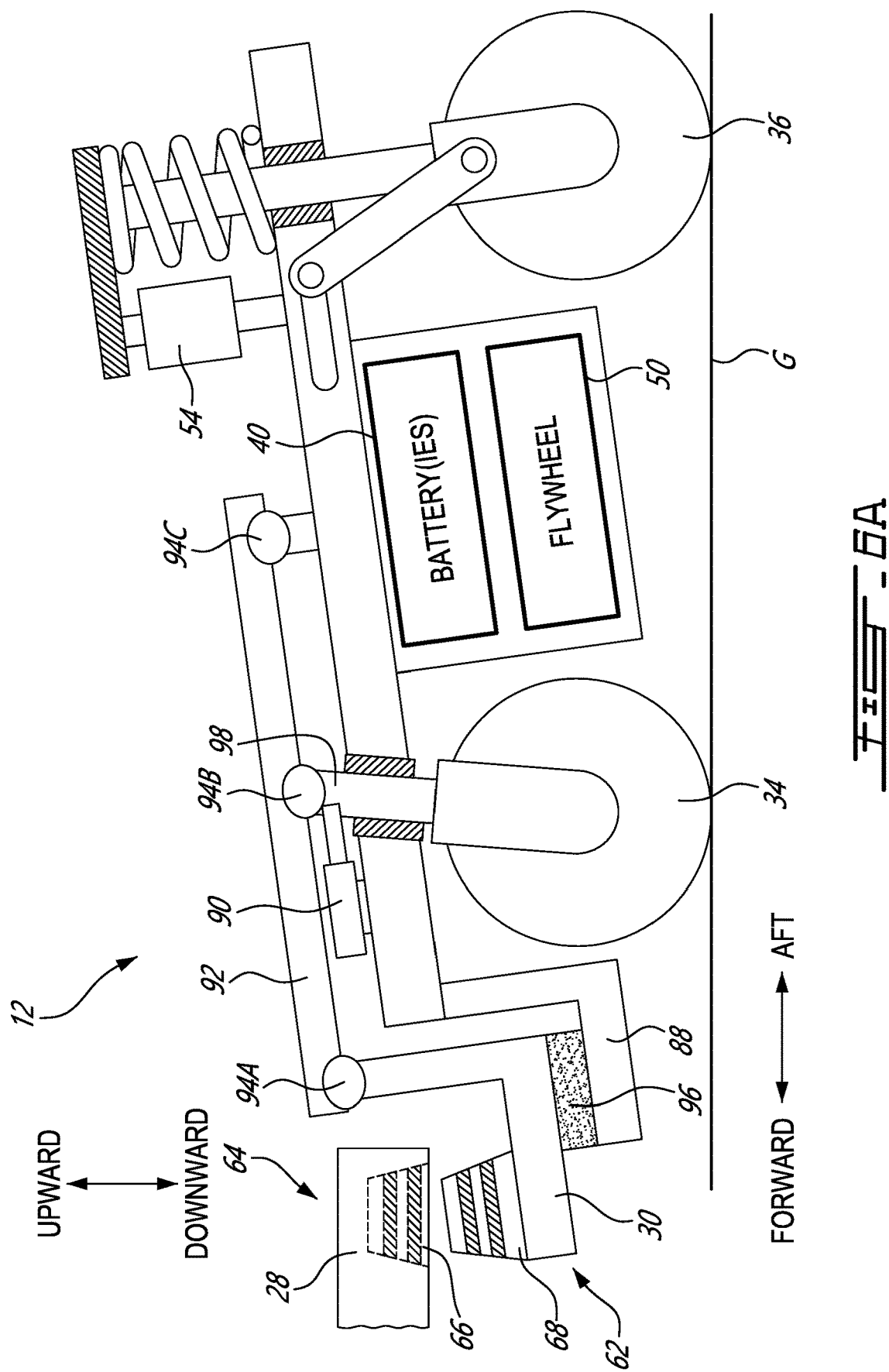

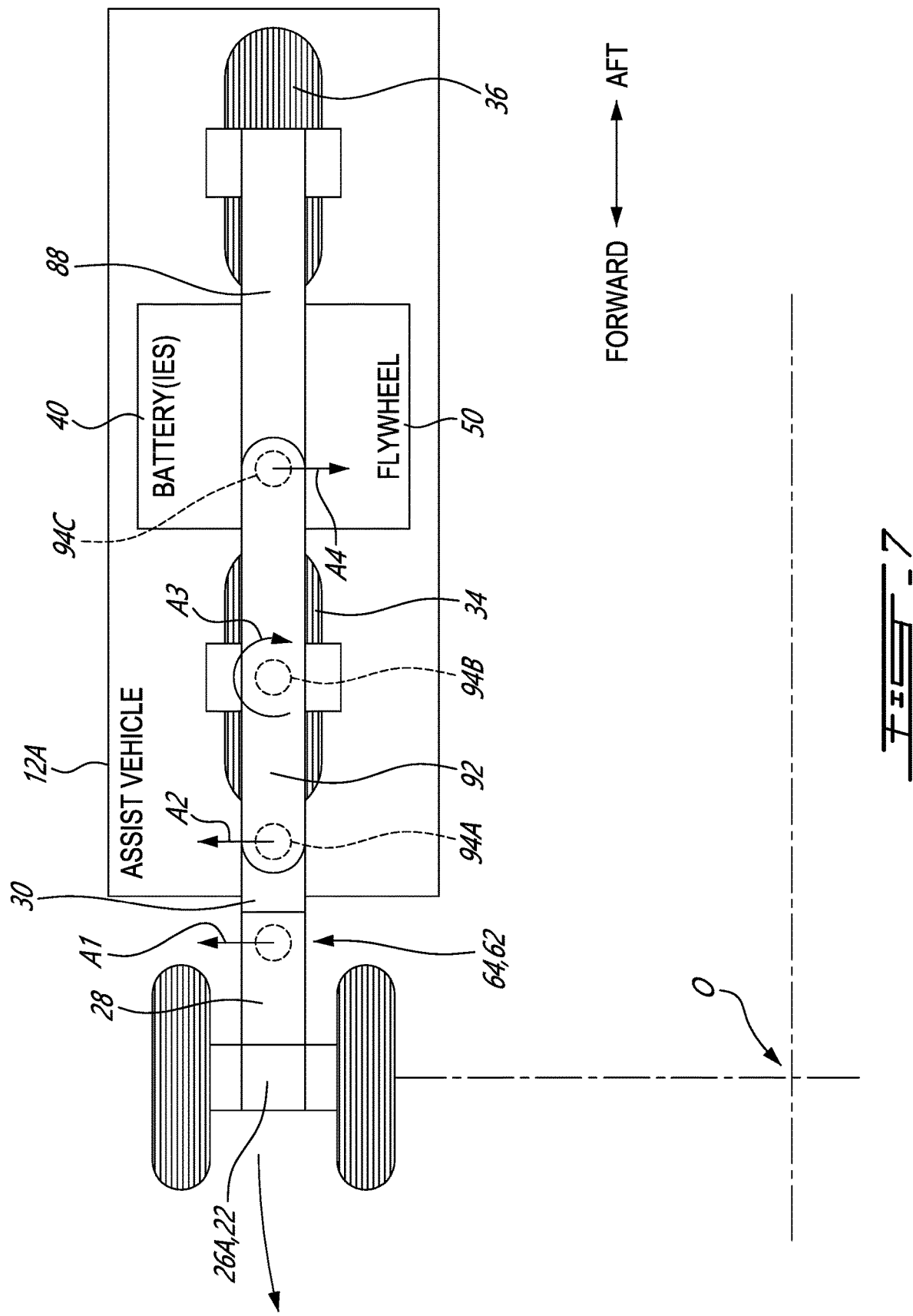

ASSIST SYSTEM AND METHOD FOR AIRCRAFT GROUND OPERATION

CROSS REFERENCE TO RELATED APPLICATION

This application is a continuation of U.S. patent application Ser. No. 17/332,162 filed on May 27, 2021, the entire contents of which are hereby incorporated by reference.

TECHNICAL FIELD

The application relates generally to aircraft and, more particularly, to ground operation of aircraft.

BACKGROUND OF THE ART

The operation of engines of an aircraft for ground movement such as taxiing an aircraft to or from a runway consumes fuel and may be relatively loud. A vehicle often referred to as a "tug" can be utilized to facilitate the ground movement of aircraft. The tug is a relatively small vehicle that couples to the aircraft nose gear so that the vehicle may tow (i.e., pull) the aircraft. Existing tugs are typically used to taxi the aircraft but are not suitable for propelling the aircraft during a takeoff phase of operation of the aircraft. Improvement is desirable.

SUMMARY

In one aspect, there is provided an aircraft takeoff assist system comprising:
an aircraft coupling counterpart attached to a strut of a landing gear of an aircraft; and
a takeoff assist vehicle including:
a frame;
ground-engaging wheels mounted to the frame;
a power source for driving one or more of the ground-engaging wheels; and
a vehicle coupling counterpart for engagement with the aircraft coupling counterpart, the aircraft coupling counterpart and the vehicle coupling counterpart defining a swivel connection for transferring a propulsive force from the takeoff assist vehicle to the aircraft, the aircraft coupling counterpart being disengageable from the vehicle coupling counterpart by upward movement of the aircraft coupling counterpart relative to the vehicle coupling counterpart.

In another aspect, there is provided an aircraft assist vehicle comprising:
a frame;
ground-engaging wheels mounted to the frame;
a power source for driving one or more of the ground-engaging wheels;
a vehicle coupling counterpart for engagement with an aircraft coupling counterpart of an aircraft to define a swivel connection for transferring a propulsive force from the aircraft assist vehicle to the aircraft, the vehicle coupling counterpart including an upwardly tapered projection having an electric port for transferring electric power from the aircraft assist vehicle to the aircraft.

In a further aspect, there is provided a method of propelling an aircraft with an assist vehicle during a takeoff roll, the method comprising:
with the assist vehicle coupled to a landing gear of the aircraft and disposed aft of the landing gear, propelling the aircraft with the assist vehicle by transferring a propulsive force from the assist vehicle to the aircraft via the landing gear during the takeoff roll; and
after propelling the aircraft with the assist vehicle during the takeoff roll, decoupling the assist vehicle from the landing gear of the aircraft.

In a further aspect, there is provided a method of propelling an aircraft on the ground using a two-wheeled unmanned motorcycle. The method comprises:
coupling the two-wheeled unmanned motorcycle to a landing gear of the aircraft; and
propelling the aircraft with the two-wheeled unmanned motorcycle by transferring a propulsive force from the two-wheeled unmanned motorcycle to the aircraft via the landing gear when the aircraft is on ground.

DESCRIPTION OF THE DRAWINGS

Reference is now made to the accompanying figures in which:

FIGS. 1A and 1B are schematic side elevation views of an exemplary assist vehicle as described herein coupled to an aircraft and assisting with the ground operation of the aircraft;

FIG. 2 is a schematic representation of an exemplary aircraft assist system including the assist vehicle of FIGS. 1A and 1B;

FIG. 3 is a schematic representation of an exemplary controller of the assist vehicle of FIG. 2;

FIG. 4 is a flow diagram of a method of propelling an aircraft using an assist vehicle when the aircraft is on the ground;

FIG. 5 is a schematic top plan view of the aircraft of FIGS. 1A and 1B with two assist vehicles coupled thereto and assisting with the ground operation of the aircraft;

FIG. 6A is an exemplary schematic representation of the assist vehicle in a first configuration in preparation for coupling to the aircraft;

FIG. 7 is a schematic top plan view of the assist vehicle of FIGS. 6A and 6B when coupled to the aircraft.

DETAILED DESCRIPTION

Figure 1B:
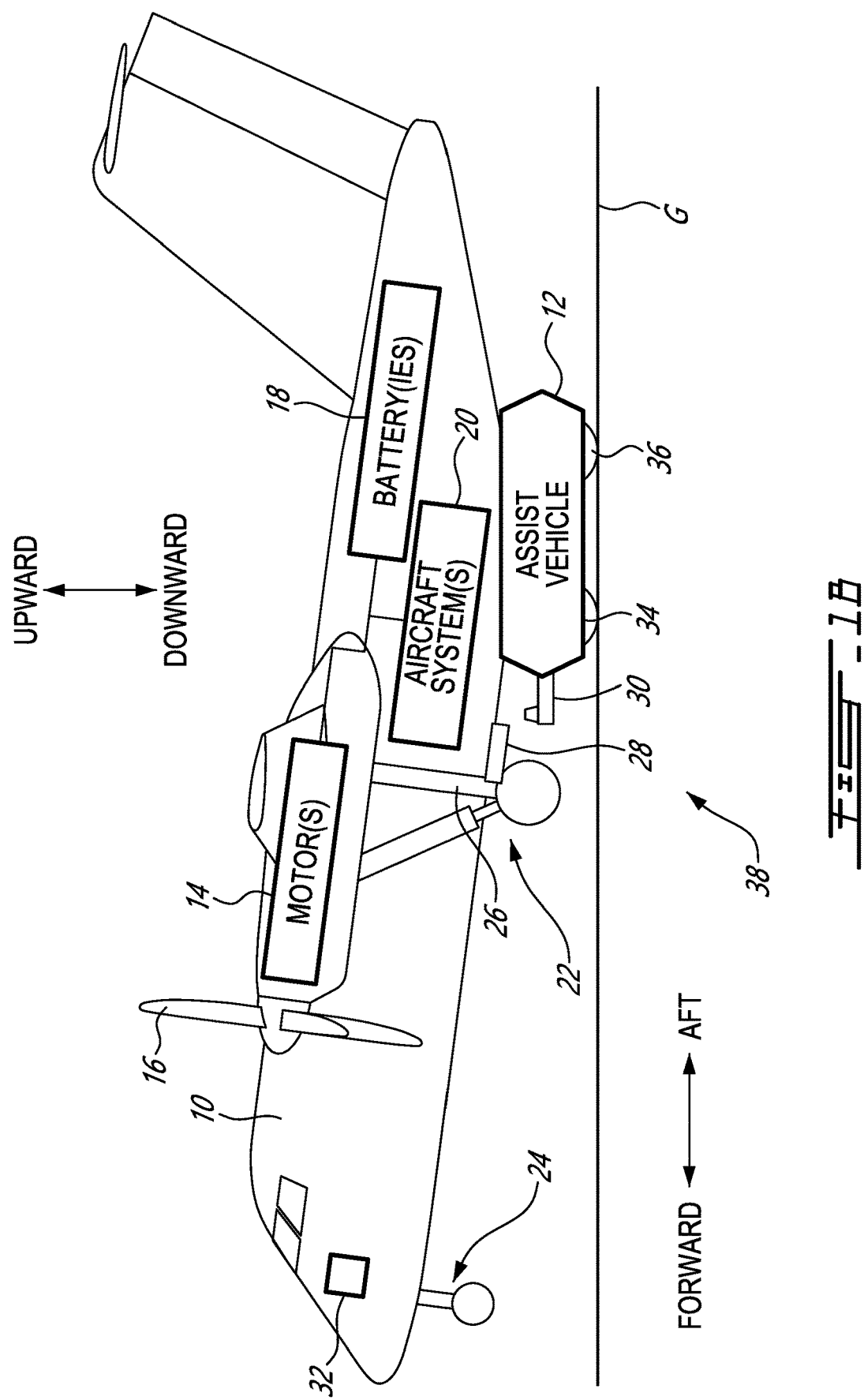

The following description relates to assist vehicles, systems and methods for assisting with ground operation of aircraft. In some embodiments, the assist vehicles, systems and methods described herein may be used to propel an aircraft during taxi and/or takeoff phases of operation of the aircraft. The assist vehicles, systems and methods described herein may be suitable for use with fuel-propelled aircraft and/or for use with electrically-propelled aircraft.

A typical fuel-powered commercial aircraft may use a quantity (e.g., 2 to 4 gallons or 7.5 to 15 litres) of fuel per passenger to taxi to the gate, wait at the gate, taxi from the gate to the waiting line and for the takeoff roll. The energy from that quantity of fuel is used to propel the aircraft, power the aircraft and to condition the passenger cabin for example. For an electrically-powered aircraft, such ground operation may cause additional challenges because the energy required is provided by onboard batteries. Even though that electric energy is consumed during the ground operation of the electrically-powered aircraft, the associated onboard battery weight must be carried for the entire flight.

Accordingly, the energy required for normal on-ground operation may represent a significant weight penalty for the electrically-powered aircraft.

A typical fuel-powered commercial aircraft may use maximum engine power during the take-off roll. At cruise, the fuel-powered aircraft may use approximately 30% of the maximum engine power. For the electrically-powered aircraft, the need to produce such high power at takeoff may also influence the size and weight of the batteries required. The battery size and weight required may depend on the type of battery(ies) used, the energy density of the battery(ies) and the discharge efficiency of the battery(ies) at the applicable load. The battery weight and size required impacts the payload, range and flight time of an electrically-powered aircraft.

In some embodiments, the assist vehicles, systems and methods described herein may be used to limit the fuel consumption of fuel-powered aircraft and/or limit the energy consumption from the onboard battery(ies) of electrically-powered aircraft during ground operation. For electrically-powered aircraft, the use of the assist vehicles, systems and methods described herein may reduce or eliminate the need for onboard battery capacity dedicated for ground operation and/or may permit more of the onboard battery capacity to be used for flight to extend the range of such aircraft.

The terms "connected", "coupled" and "attached" used herein may include both direct connection, coupling or attachment (in which two elements contact each other), and indirect connection, coupling or attachment (in which at least one additional element is located between the two elements). The term "substantially" as used herein may be applied to modify any quantitative representation which could permissibly vary without resulting in a change in the basic function to which it is related.

FIG. 1A is a schematic side elevation view of an exemplary aircraft 10 with an exemplary assist vehicle 12 coupled thereto to assist with ground operation of aircraft 10. As explained further below, two or more assist vehicles 12 may be coupled to aircraft 10 to assist with ground operation of aircraft 10. As described herein, assist vehicle 12 may assist with powering aircraft 10 and/or propelling aircraft 10 while aircraft 10 is on ground G. In various situations, ground G may represent an airport apron, taxiway, runway or any surface on which ground movement or stationary operation of aircraft 10 may be conducted.

Aircraft 10 may be any type of manned or unmanned aircraft such as a private or commercial passenger aircraft. Aircraft 10 may be a fixed-wing aircraft comprising one or more electric aircraft motors 14 (referred hereinafter in the singular) driving one or more propellers 16. Aircraft 10 may be electrically-powered but it is understood that assist vehicle 12 may also be used with fuel-powered aircraft (e.g., propelled by gas turbine engines). Aircraft 10 may include one or more aircraft batteries 18 (referred hereinafter in the singular) operatively connected to supply electric power to aircraft motor 14 and also one or more other aircraft systems 20. Aircraft systems 20 may include an environmental control system for conditioning a passenger cabin of aircraft 10, an anti-icing system, a lighting system, a hydraulic system, avionics, lavatory operation and/or other electric load(s) that may be onboard aircraft 10.

Assist vehicle 12 may be coupled to aircraft 10 so that a propulsive force may be transferred from assist vehicle 12 to aircraft 10. Assist vehicle 12 may be suitable to propel aircraft 10 in the forward and/or aft directions as indicated in FIG. 1A and may also be suitable to propel aircraft 10 along a curved trajectory. In various embodiments, assist vehicle 12 may be configured to be coupled to main landing gear 22, to nose landing gear 24, and/or to another suitable coupling location on aircraft 10. In some embodiments, assist vehicle 12 may be configured to be coupled to strut 26 of main landing gear 22 so that the propulsive force(s) may be transferred to aircraft 10 via strut 26.

The coupling of aircraft 10 with assist vehicle 12 may be achieved via suitable coupling counterparts between trailing link 28 of aircraft 10 and push link 30 of assist vehicle 12. Trailing link 28 may be attached (e.g., fastened or otherwise secured) to strut 26. Trailing link 28 may extend aft (rearwardly) of strut 26. Push (and/or pull) link 30 may be attached to assist vehicle 12. Push link 30 may be disposed in a front region of assist vehicle 12. The coupling between trailing link 28 and push link 30 may provide a swivel connection suitable for transferring a (e.g., pushing or pulling) propulsive force between aircraft 10 and assist vehicle 12 while also permitting a swivelling movement between trailing link 28 and push link 30. The configuration of trailing link 28 and push link 30 may cause the swivel connection to be disposed aft of strut 26 and also permit assist vehicle 12 to be positioned aft of strut 26 and of main landing gear 22 when assist vehicle 12 is coupled to aircraft 10 and optionally propelling aircraft 10 when aircraft 10 is on ground G. The position of assist vehicle 12 aft of main landing gear 22 may facilitate the use of assist vehicle 12 for propelling aircraft 10 during takeoff of aircraft 10 so that assist vehicle 12 may be left behind aircraft 10 and clear of the path of aircraft 10 when aircraft 10 takes flight as shown in FIG. 1B.

When assist vehicle 12 is coupled to aircraft 10 and optionally propelling aircraft 10, electric power may be transferred from assist vehicle 12 to aircraft 10 to power one or more aircraft systems 20 and/or aircraft motor 14. This may permit aircraft 10 to be electrically powered via assist vehicle 12 in order to reduce or eliminate the need for aircraft 10 to consume electric power from onboard aircraft battery 18 during ground operation. When aircraft 10 is propelled forward by assist vehicle 12 during the takeoff roll for example, aircraft motor 14 may also be driven so that aircraft 10 may also be propelled via propeller 16. In this scenario, assist vehicle 12 may be used to supplement the propulsion provided via aircraft motor 14. In various embodiments, electric power transferred from assist vehicle 12 and/or from onboard aircraft battery 18 may be used to drive aircraft motor 14 and accelerate aircraft 10 to the rotation speed during the takeoff roll.

When assist vehicle 12 is coupled to aircraft 10, data may be transferred between assist vehicle 12 and one or more devices 32 of aircraft 10 via wired and/or wireless connection(s). Such aircraft devices 32 may include brake/rudder pedals, a tiller, and/or a thrust (e.g., throttle) lever for example. In some embodiments, such data received at assist vehicle 12 may represent pilot commands to brake, steer and/or accelerate aircraft 10. Such data may be used to control the operation of assist vehicle 12 and cause assist vehicle 12 to react in accordance with pilot commands.

As explained below, assist vehicle 12 may be configured as an unmanned self-driving (e.g., autonomous) two-wheeled motorcycle including front wheel 34 and rear wheel 36 arranged in tandem. Push link 30 may be disposed in tandem with front wheel 34 and rear wheel 36. Front wheel 34 may be disposed between push link 30 and rear wheel 36. It is understood that assist vehicle 12 may have other configurations than those shown herein. For example, assist vehicle 12 may be a three-wheeled or a four-wheeled vehicle in some embodiments.

FIG. 1B is a schematic side elevation view of aircraft 10 taking flight after being propelled by assist vehicle 12 during the takeoff roll during which the aircraft 10 is accelerated from a standstill to an airspeed that provides sufficient lift for aircraft 10 to become airborne. The scenario illustrated in FIG. 1A may represent the propelling of aircraft 10 using assist vehicle 12 during the takeoff roll. The moment shown in FIG. 1B may be shortly after lift-off when the wings of aircraft 10 are lifting the weight of aircraft 10 off of ground G. In some situations, the lift-off may be accompanied by the pilot of aircraft 10 causing rotation of aircraft 10 to bring the nose of aircraft 10 upward and increase the angle of attack of aircraft 10. In some embodiments, assist vehicle 12 may be used to propel aircraft 10 until the rotation speed of aircraft 10 has been reached. For some (e.g., earlier) portion(s) of the takeoff roll, a majority or all of the propulsive force required to accelerate aircraft 10 may be supplied by one or more assist vehicles 12. For some (e.g., later) portion(s) of the takeoff roll, aircraft motor 14 of aircraft 10 may also operate to generate some of the propulsive force so that when the propulsion of aircraft 10 via assist vehicle 12 is ceased at or around lift-off for example, the propulsion of aircraft 10 may continue and be taken over by aircraft motor 14 and propeller(s) 16.

The coupling mechanism used to coupled assist vehicle 12 to aircraft 10 may be configured to remain in a force-transmitting engagement when aircraft 10 is on ground G and being propelled by assist vehicle 12, and automatically become disengaged after the takeoff roll. In other words, the coupling mechanism may, in some embodiments, be configured to self-disengage at the appropriate time at or near the end of the takeoff roll. For example, the coupling mechanism may be configured to become automatically disengaged by upward movement of trailing link 28 of aircraft 10 relative to push link 30 of assist vehicle 12 as explained below.

FIG. 2 is a schematic representation of an exemplary aircraft assist system 38 including assist vehicle 12. In some embodiments, aircraft assist system 38 may include two assist vehicles 12. In various embodiments, assist vehicle 12 may be fuel-powered (e.g., include an internal combustion engine), electrically powered via one or more vehicle battery(ies) 40 (referred hereinafter in the singular) and one or more electric vehicle motors 42, or may include a hybrid (e.g., fuel and electric) powertrain. In embodiments where assist vehicle 12 is electrically powered as illustrated in FIG. 2, the powertrain of assist vehicle 12 may include battery 40 and one or more electric vehicle motors 42 drivingly coupled to front wheel 34 and/or to rear wheel 36. In some embodiments, vehicle motor(s) 42 may include one or more in-wheel electric motors operatively coupled to drive front wheel 34 and/or rear wheel 36 to propel assist vehicle 12.

In some embodiments, battery 40 may serve as a power source for propelling assist vehicle 12 and also for supplying electric power to aircraft 10. In some embodiments, battery 40 may include a lithium-ion or other suitable type of battery(ies). Various aspects of assist vehicle 12 may be sized based on the duty cycle of assist vehicle 12 and based on the specifications of aircraft 10 that assist vehicle 12 will be assisting. In some embodiments and depending on the type of battery(ies) used, battery 40 may be sized to have a mass of 40 to 80 kg/passenger of aircraft 10.

In some embodiments, assist vehicle 12 may be configured to provide 100% of the normal acceleration of aircraft 10 obtainable from aircraft motor 14 during at least part of the takeoff roll which may last about 15 seconds. In some embodiments, assist vehicle 12 may be configured to also provide electric power to aircraft motor 14. The combined propulsion of aircraft 10 via assist vehicle 12 and via aircraft motor 14 may provide an increased acceleration of aircraft 10 when using a short runway or having a heavy payload.

The operation of vehicle motor(s) 42 and the delivery of electric power from battery 40 to vehicle motor(s) 42 may be controlled by controller 44 via a suitable power electronics module (PEM) 46 including electronic switches to perform a suitable power conversion function and provide vehicle motor(s) 42 with electric power having the desired voltage, current, waveform, etc. to implement the desired propulsion behaviour and performance of assist vehicle 12 when assist vehicle 12 is coupled to aircraft 10 or when assist vehicle 12 is in transit to/from aircraft 10 such as, for example, between aircraft 10 and base station 48.

The powertrain of assist vehicle 12 may also include flywheel 50 that may serve to store kinetic energy. In embodiments where assist vehicle 12 is a two-wheeled vehicle, flywheel may also serve an additional function of providing dynamic stability in helping keep assist vehicle 12 in the upright orientation during use. In some situations, flywheel 50 may be driven by vehicle motor(s) 42 to store energy in preparation for propelling aircraft 10 for example. In situations where assist vehicle 12 must rapidly accelerate aircraft 10 during the takeoff role for example, energy stored in flywheel 50 may be used to supplement the propulsive force delivered from vehicle motor(s) 42 via front wheel 34 and/or rear wheel 36. The energy stored in flywheel 50 may be transferred to front wheel 34 and/or to rear wheel 36 via one or more suitable clutches (not shown) for example. In some situations where braking of assist vehicle 12 is required, recuperative braking may be conducted by transferring energy from front wheel 34 and/or from rear wheel 36 to flywheel 50 via the same or other clutch(es). Battery 40 and flywheel 50 may be disposed between front wheel 34 and rear wheel 36.

In various embodiments of assist vehicle 12, front wheel 34 and/or rear wheel 36 may be steerable via one or more steering actuators 52 (referred hereinafter in the singular). Steering actuator 52 may include an electric actuator or a hydraulic actuator for example. Steering actuator 52 may be operatively connected to be controllable via controller 44.

In some embodiments, assist vehicle 12 may include a variable-height suspension to facilitate coupling and uncoupling of assist vehicle 12 to and from aircraft 10 as described further below. Assist vehicle 12 may include one or more kneeling actuators 54 (referred hereinafter in the singular) operatively connected to front wheel 34 and/or to rear wheel 36 to permit a frame of assist vehicle 12 to be raised and lowered relative to ground G. Kneeling actuator 54 may include an electric actuator or a hydraulic actuator for example. Kneeling actuator 54 may be operatively connected to be controllable via controller 44.

In some embodiments, assist vehicle 12 may be unmanned and self-driving (e.g., partially or entirely autonomous). Assist vehicle 12 may include navigation system 56 operatively connected to controller 44 to guide the movement of assist vehicle 12 during one or more portions of its duty cycle. Navigation system 56 may include a position data feedback system which may be global positioning system (GPS)-based and/or gyroscope-based. Real-time position data of assist vehicle 12 may be used to control movement of assist vehicle 12 when not coupled to aircraft 10. Navigation system 56 may permit navigation of the airfield using optical markers, magnetic markers, beacons, GPS or a combination of these methods. The approach of assist vehicle 12 to aircraft 10 and main landing gear 22 in preparation for coupling may be guided by one or more proximity sensor(s) 58 disposed on assist vehicle 12 and one or more cooperating targets 60 disposed on trailing link 28, on main landing gear 22 or elsewhere on aircraft 10. In some embodiments, the approach of assist vehicle 12 to aircraft 10 and main landing gear 22 in preparation for coupling may be guided through the use of radar-, laser- or ultrasound-based distance measurement systems or a combination of different measurement systems. Alternatively or in addition, the use of image recognition may also be used to guide the movement and operation of assist vehicle 12 and facilitate coupling to aircraft 10.

During operation, assist vehicle 12 may be in wireless communication with base station 48 and/or with aircraft 10 to permit commands to be wirelessly transmitted to assist vehicle 12 and/or permit the operation and status of assist vehicle 12 may be monitored and/or controlled remotely by computer and/or by a human operator for example. During a departure of aircraft 10, the duty cycle of assist vehicle 12 may include moving assist vehicle 12 from base station 48 to aircraft 10, coupling assist vehicle 12 to aircraft 10, taxiing aircraft 10 from a gate or hanger to the brake-release point of an active runway, propelling aircraft 10 during the takeoff roll, decoupling assist vehicle 12 from aircraft 10, and returning assist vehicle 12 to base station 48. During an arrival of aircraft 10, the duty cycle of assist vehicle 12 may include moving assist vehicle 12 from base station 48 to aircraft 10 when aircraft 10 has finished the landing roll, coupling assist vehicle 12 to aircraft 10, taxiing aircraft 10 to the gate or hanger, decoupling assist vehicle 12 from aircraft 10 and returning assist vehicle 12 to base station 48. In some embodiments, base station 48 may also include a charging facility for recharging battery 40 of assist vehicle 12, and/or may include a re-fueling station.

The coupling of assist vehicle 12 to aircraft 10 may be achieved via the engagement of cooperating vehicle coupling counterpart 62 of assist vehicle 12 and aircraft coupling counterpart 64 of aircraft 10. In various embodiments, vehicle coupling counterpart 62 and aircraft coupling counterpart 64 may provide mechanical engagement and optionally also electric, pneumatic and/or data transfer engagement. In some embodiments, vehicle coupling counterpart 62 and aircraft coupling counterpart 64 may, when engaged with each other, be configured to define a swivel connection having swivel axis S. The swivel connection may also be configured to transfer the propulsive force between assist vehicle 12 and aircraft 10. In some embodiments, the coupling mechanism may include suitable (e.g., mechanical, electro-mechanical, electro-pneumatic and/or electro-magnetic) linkage(s).

In some embodiments, vehicle coupling counterpart 62 and aircraft coupling counterpart 64 may be engaged and disengaged by way of relative vertical movement between vehicle coupling counterpart 62 and aircraft coupling counterpart 64. For example, aircraft coupling counterpart 64 may be disengaged from vehicle coupling counterpart 62 by upward movement of aircraft coupling counterpart 64 relative to vehicle coupling counterpart 62. Such disengagement mechanism may facilitate automated and self-decoupling of assist vehicle 12 from aircraft 10 following the takeoff roll.

In some embodiments, aircraft coupling counterpart 64 may include socket 66 with a downwardly facing opening. Socket 66 may be integrated with or otherwise attached to trailing link 28. Vehicle coupling counterpart 62 may include projection 68 configured to be received into socket 66 and matingly engaged with socket 66. Projection 68 may be integrated with or otherwise attached to push link 30. Alternatively, in some embodiments, a socket with an upwardly facing opening could instead be integrated with or otherwise attached to push link 30, and a cooperating projection could instead be integrated with or otherwise attached to trailing link 28. Socket 66 and projection 68 may be made from metallic or other suitable structural material(s).

Other types of coupling mechanisms may be suitable. For example, various shapes of socket 66 and of projection 68 are envisioned. In some embodiments, projection 68 and/or socket 66 may be upwardly tapered. In some embodiments, the outer shape of projection 68 and/or the inner shape of socket 66 may be axisymmetric about swivel axis S defined when projection 68 is received in socket 66. In some embodiments, projection 68 and/or socket 66 may be at least partially conical in shape. For example, projection 68 and/or socket 66 may have a generally frustoconical shape. For example, projection 68 and/or socket 66 may have the general shape of a frustum. In some embodiments, projection 68 and/or socket 66 may be at least partially cylindrical and/or at least partially spherical in shape.

Projection 68 and socket 66 may optionally cooperatively define an electric power transfer interface between assist vehicle 12 and aircraft 10 to permit electric power to be transferred from assist vehicle 12 to aircraft 10. The electric power interface may be defined by way of aircraft electric port 70 disposed in socket 66, and cooperating vehicle electric port 72 disposed on projection 68. In some embodiments, aircraft electric port 70 and vehicle electric port 72 may include electric contact surfaces that are (e.g., ring-shaped or otherwise) configured to accommodate some swivelling movement between socket 66 and projection 68.

Projection 68 and socket 66 may optionally cooperatively define a data transfer interface between assist vehicle 12 and aircraft 10 to permit commands from aircraft device(s) 32 to be received by assist vehicle 12 and/or other (e.g., aircraft-mission-relevant) data transfer between assist vehicle 12 and aircraft 10. The data transfer interface may be defined by way of aircraft data port 74 disposed in socket 66, and cooperating vehicle data port 76 disposed on projection 68. In some embodiments, aircraft data port 74 and vehicle data port 76 may include contact surfaces that are (e.g., ring-shaped or otherwise) configured to accommodate some swivelling movement between socket 66 and projection 68. Aircraft data port 74 and vehicle data port 76 may provide a wired connection for data transfer. Alternatively or in addition, data transfer between assist vehicle 12 and aircraft 10 may be conducted wirelessly.

Projection 68 and socket 66 may optionally cooperatively define a pneumatic interface between assist vehicle 12 and aircraft 10 to permit pressurized air to be transferred from assist vehicle 12 to aircraft 10. In some embodiments, assist vehicle 12 may include a compressor, tank or other source of pressurized air that may be used to supply one or more pneumatic loads onboard of aircraft 10 when assist vehicle 12 is coupled to aircraft 10.

FIG. 3 is an exemplary schematic representation of controller 44 of assist vehicle 12. Controller 44 may include one or more data processors 78 (referred hereinafter as "processor 78") and non-transitory machine-readable memory 80. Controller 44 may be configured to control various aspects of operation of assist vehicle 12. Controller 44 may receive input(s) 82, perform one or more procedures or steps defined by instructions 84 stored in memory 80 and executable by processor 78 to generate output(s) 86. Controller 44 may include multiple controllers onboard assist vehicle 12, and/or some controllers may be located remotely of assist vehicle 12

Controller 44 may carry out additional functions than those described herein. Processor 78 may include any suitable device(s) configured to cause a series of steps to be performed by controller 44 so as to implement a computer-implemented process such that instructions 84, when executed by controller 44 or other programmable apparatus, may cause the functions/acts specified in the methods described herein to be executed. Processor 78 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 80 may include any suitable machine-readable storage medium. Memory 80 may include non-transitory computer readable storage medium such as, for example, but not limited to, an electronic, magnetic, optical, electromagnetic, infrared, or semiconductor system, apparatus, or device, or any suitable combination of the foregoing. Memory 80 may include a suitable combination of any type of machine-readable memory that is located either internally or externally to controller 44. Memory 80 may include any storage means (e.g. devices) suitable for retrievably storing machine-readable instructions 84 executable by processor 78.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 80) having computer readable program code (e.g., instructions 84) embodied thereon. Computer program code for carrying out operations for aspects of the present disclosure in accordance with instructions 84 may be written in any combination of one or more programming languages. Such program code may be executed entirely or in part by controller 44 or other data processing device(s). It is understood that, based on the present disclosure, one skilled in the relevant arts could readily write computer program code for implementing the methods described and illustrated herein.

FIG. 4 is a flow diagram of an exemplary method 1000 of assisting with ground operation and/or propelling of aircraft 10. Method 1000 may be performed using assist vehicle 12 or other assist vehicle when aircraft 10 is on ground G. Machine-readable instructions 84 may be configured to cause controller 44 to cause actions useful in performing at least part of method 1000. Aspects of method 1000 may be combined with other actions or aspects of other methods described herein. Aspects of aircraft assist system 38 and of assist vehicle 12 described herein may also be incorporated into method 1000. In various embodiments, method 1000 may include:

coupling assist vehicle 12 to main landing gear 22 of aircraft 10 (block 1002); and propelling aircraft 10 with assist vehicle 12 (block 1004).

Aspects of method 1000 are described below in reference to other figures provided herein. As shown in FIG. 1A, assist vehicle 12 may be coupled to main landing gear 22 so that assist vehicle 12 is disposed aft of main landing gear 22. Propelling of aircraft 10 with assist vehicle 12 may be performed by transferring a propulsive (e.g., pushing or pulling) force from assist vehicle 12 to aircraft 10 via main landing gear 22. Propelling of aircraft 10 with assist vehicle 12 may be performed during a taxi and/or during a takeoff phase of operation (e.g., during the takeoff roll) of aircraft 10. After propelling aircraft 10 with the assist vehicle 12, assist vehicle 12 may be decoupled from main landing gear 22 of aircraft 10. The location of assist vehicle 12 behind main landing gear 22 may allow assist vehicle 12 to be left behind aircraft 10 and reduce the risk of assist vehicle 12 interfering with the forward movement of aircraft 10 in the event of a malfunction for example. Part of the duty cycle of assist vehicle 12 may include autonomously driving from base station 48 to aircraft 10 before propelling aircraft 10, and autonomously driving back to base station 48 after propelling aircraft 10.

FIG. 5 is a schematic top plan view of aircraft 10 with two assist vehicles 12A and 12B (also referred generally herein as "assist vehicle 12") coupled thereto and assisting with the ground operation, and/or assisting with the propulsion of aircraft 10 during the takeoff roll and/or during taxi. Assist vehicles 12A, 12B may each be configured as a relatively fast two-wheeled unmanned motorcycle. In some embodiments assist vehicles 12A, 12B may be used to propel aircraft 10 forward and rearward. Differential traction between assist vehicles 12A, 12B may also cause turning of aircraft 10 to allow aircraft 10 to follow a curved trajectory or to be reoriented for example.

First assist vehicle 12A may be coupled to first strut 26A of main landing gear 22 and second assist vehicle 12B may be coupled to second strut 26B of main landing gear 22 as shown in FIG. 5. In this configuration, respective propulsive forces may be transferred to aircraft by respective first and second assist vehicles 12A, 12B via respective first and second struts 26A, 26B. As explained above, electric power may be transferred from one or from both first and second assist vehicles 12A, 12B to aircraft motor 14 and/or other aircraft systems 20. Data from aircraft device(s) 32 may also be transferred to one or to both first and second assist vehicles 12A, 12B so that first and/or second assist vehicles 12A, 12B may be controlled according to pilot commands. After propelling aircraft 10 with first and second assist vehicles 12A, 12B during the takeoff roll, or after other type of aircraft assistance provided, first and second assist vehicles 12A, 12B may be decoupled from their respective first and second struts 26A, 26B.

Figure 6B:
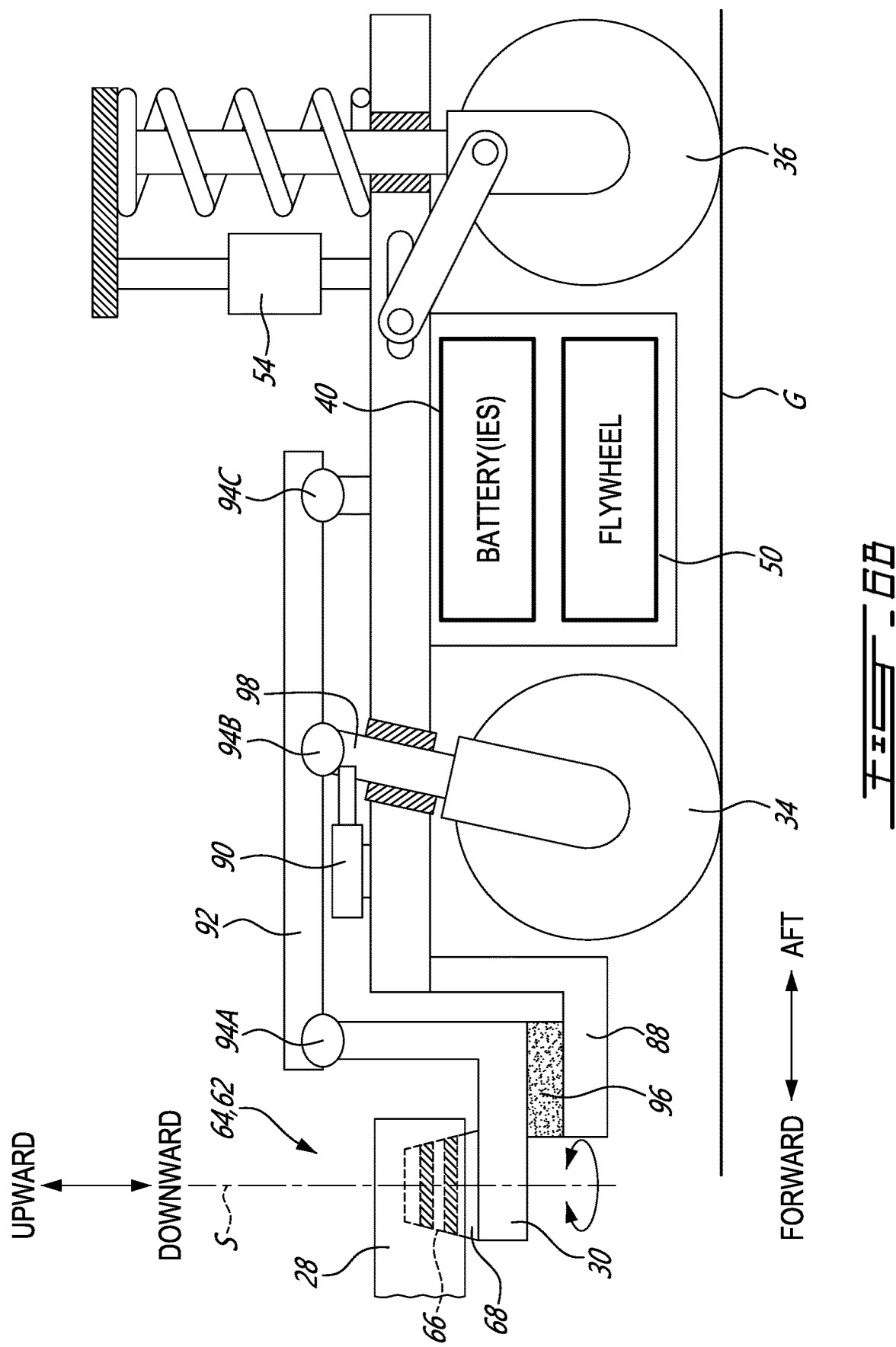
FIG. 6B is another exemplary schematic representation of the assist vehicle in a second configuration when the assist vehicle is coupled to the aircraft.

FIG. 6A is an exemplary schematic representation of assist vehicle 12 in a first configuration in preparation for coupling to aircraft 10. In various embodiments, vehicle coupling counterpart 62 and aircraft coupling counterparts 64 may be configured to be engaged manually by a human operator, or may be configured to be engaged autonomously. For example, assist vehicle 12 may be configured to cause vertical movement of projection 68 by way of push link being articulated and controllably movable relative to frame 88 of assist vehicle 12. In the embodiment shown in FIGS. 6A, assist vehicle 12 may have a variable height suspension configured to cause kneeling of assist vehicle 12 in order to lower projection 68 below socket 66 and then raise projection 68 into socket 66 to cause engagement of projection 68 with socket 66. Kneeling of assist vehicle 12 may be achieved via kneeling actuator 54 adjusting the position of rear wheel 36 relative to frame 88. For example, moving (e.g., deploying) rear wheel 36 to cause a rear portion of frame 88 to be raised may cause projection 68 to be lowered to a height permitting projection 68 to be advanced under socket 66 of trailing link 28. Once projection 68 is aligned with socket 66, rear wheel 36 may be moved in the opposite direction (e.g., retracted) to cause the rear portion of frame 88 to be lowered and consequently projection 68 to become engaged with socket 66 as shown in FIG. 6B. In other words, the actuation of kneeling actuator 54 and the resulting variable position of rear wheel 36 may cause frame 88 to pivot as a lever about front wheel 34 serving as a fulcrum.

Assist vehicle 12 may include frame 88 to which front wheel 34 and rear wheel 36 may be mounted. Front wheel 34 may be steerable via steering actuator 52 shown in FIG. 2. In some embodiments, assist vehicle 12 may include steering damper 90 sometimes called a steering stabilizer. Steering damper 90 may hinder or prevent undesirable and uncontrolled steering movements or oscillations known as "wobble" in motorcycling. Steering damper 90 may allow steering during autonomous operation and may also help hold front wheel 34 straight when assist vehicle 12 is propelling aircraft 10 at relatively high speed for example.

Push link 30 may be mounted in cantilevered manner in a front portion of assist vehicle 12 and forward of front wheel 34. In other words, front wheel 34 may be disposed between projection 68 and rear wheel 36. Push link 30 may be movably attached to frame 88 of assist vehicle 12 in order to permit some relative movement between projection 68 and frame 88 during operation. In some embodiments, push link 30 may be attached to control link 92 at first connection 94A. Frame 88 and control link 92 may be made from metallic material(s) (e.g., aluminum, steel) or other suitable structural material(s). Frame 88 and control link 92 may have a relatively rigid construction.

First connection 94A may permit relative (e.g., rotational, pivotal) movement between push link 30 and control link 92. In some embodiments, first connection 94A may include a knuckle joint, hinge joint, a ball and socket (i.e., spheroid) joint, or a elastomeric (e.g., rubber) bushing for example. Push link 30 may also be supported by frame 88 via pad 96 which may provide some damping while allowing some relatively small omnidirectional movement of push link 30 and projection 68 relative to frame 88. Pad 96 may be made of an elastomeric (e.g., rubber) or other vibration damping material.

Control link 92 may be connected to a top end of steering shaft 98 of front wheel 34 at second connection 94B. Steering shaft 98 may be pivotable relative to control link 92. Second connection 94B may be a cylindrical joint or a ball and socket joint. Control link 92 may also be connected to frame 88 at third connection 94C. Third connection 94C may be axially disposed between front wheel 34 and rear wheel 36. Third connection 94C may be a substantially rigid connection between control link 92 and frame 88. In various embodiments, control link 92 may be fastened or otherwise secured to frame 88 at third connection 94C.

In some embodiments, all or part of vehicle battery 40 and/or all or part of flywheel 50 may be disposed between front wheel 34 and rear wheel 36.

FIG. 6B is another exemplary schematic representation of assist vehicle 12 in a second configuration where assist vehicle 12 is coupled to aircraft 10. In this configuration, kneeling actuator 54 has caused rear wheel 36 to be retracted and consequently caused projection 68 to be raised and become received into and engaged with socket 66. In some situations, rear wheel 36 may be retracted until a relatively small load is carried by rear wheel 36. By way of front wheel 34 serving as a fulcrum, this loading may cause some of the weight of aircraft 10 to be transferred from trailing link 28 via socket 66 and projection 68 to push link 30, to frame 88 and consequently to front wheel 34. This loading may cause front wheel 34 to be loaded with some weight of assist vehicle 12 and some weight of aircraft 10 and may promote good traction of front wheel 34 with ground G when front wheel 34 is driven to propel aircraft 10. The positional adjustment of rear wheel 36 relative to frame 88 causing weight of aircraft 10 to push downwardly on front wheel 34 may also promote secure engagement of projection 68 with socket 66. When projection 68 is engaged with socket 66, assist vehicle 12 may be pivot relative to aircraft 10 about swivel axis S.

FIG. 7 is a schematic top plan view of assist vehicle 12 of FIG. 5 when coupled to first strut 26A of aircraft 10 during a turning maneuver of aircraft 10. When aircraft is propelled by assist vehicles 12A and 12B, the turning maneuver may be initiated by the pilot and caused by the turning of nose landing gear 24 and/or a differential application of aircraft brakes. In some embodiments, the two-wheeled arrangement of assist vehicle 12A may be suitable for accommodating and react to steering of aircraft 10. The two-wheeled construction of assist vehicle 12A may be relatively simple and light relative to a three-wheeled or four-wheeled alternative. Also, by virtue of the two wheels being arranged in tandem, this arrangement may promote self-alignment of assist vehicle 12 with aircraft 10 at various phases of ground operation including the takeoff roll.

In reference to FIGS. 6A and 6B, control link 92 may help dynamically stabilize assist vehicle 12 and hinder uncontrolled shimmy. When nose landing gear 24 steers one way and causes aircraft 10 to rotate about point O for example, the whole aircraft 10 may start yawing in that direction and cause trailing link 28 to wag in the opposite direction as indicated by arrow A1. This may cause push link 30 to tilt due to the lateral moment applied by socket 66. This may make a forward part of control link 92 also wag with trailing link 28 as indicated by arrow A2 at the location of first connection 94A. Control link 92 may then be caused to pivot about second connection 94B as indicated by arrow A3. Such behaviour of control link 92 may consequently induce an opposite lateral motion of frame 88 as indicated by arrow A4 at third connection 94C. The lateral motion of frame 88 may force rear wheel 36 to become out of alignment with (e.g., angled relative to) front wheel 34. This may consequently induce an automatic anticipative steering motion of assist vehicle 12 causing assist vehicle 12 to enter a circular path behind aircraft 10 in response to the steering of aircraft 10. In some embodiments, the behaviour of assist vehicle 12 in response to steering of aircraft 10 may be assisted by steering actuator 52 based on one or more pilot commands indicative of steering of nose landing gear 24 and/or a differential application of aircraft brakes communicated from aircraft 10 to assist vehicle 12 as described above for example.

In reference to the figures herein, in one aspect, the disclosure describes an aircraft takeoff assist system 38 comprising: an aircraft coupling counterpart 64 attached to a strut 26 of a landing gear 22 of an aircraft 10; and a takeoff assist vehicle 12 including: a frame 88; ground-engaging wheels 34, 36 mounted to the frame 88; a power source (e.g., vehicle battery 40, vehicle motor 42) for driving one or more of the ground-engaging wheels 34, 36; and a vehicle coupling counterpart 62 for engagement with the aircraft coupling counterpart 64, the aircraft coupling counterpart 64 and the vehicle coupling counterpart 62 defining a swivel connection for transferring a propulsive force from the takeoff assist vehicle 12 to the aircraft 10, the aircraft coupling counterpart 64 being disengageable from the vehicle coupling counterpart 62 by upward movement of the aircraft coupling counterpart 64 relative to the vehicle coupling counterpart 62.

The takeoff assist vehicle 12 may be an unmanned two-wheeled motorcycle.

The swivel connection may be disposed aft of the strut 26 of the landing gear 22.

The landing gear 22 may be a main landing gear 22 of the aircraft 10.

In some embodiments of the aircraft takeoff assist system 38: the takeoff assist vehicle 12 may be a first takeoff assist vehicle 12A; the aircraft coupling counterpart 64 may be a first aircraft coupling counterpart 64; the strut 26 may be a first strut 26A; the landing gear 22 may be a main landing gear 22 of the aircraft 10; and the aircraft takeoff assist system 38 may include a second takeoff assist vehicle 12B for engagement with a second strut 26B of the main landing gear 22.

The first and second takeoff assist vehicles 12A, 12B may be unmanned two-wheeled motorcycles.

In some embodiments of the aircraft takeoff assist system 38: the aircraft coupling counterpart 64 may include a socket 66 with a downwardly facing opening; and the vehicle coupling counterpart 62 may include a projection 68 configured to be received in the socket 66.

The projection 68 may be upwardly tapered.

The projection 68 may have a conical shape.

The projection 68 and the socket 66 may cooperatively define an electric power transfer interface between the takeoff assist vehicle 12 and the aircraft 10.

The projection 68 and the socket 66 may cooperatively define a data transfer interface between the takeoff assist vehicle 12 and the aircraft 10.

The aircraft coupling counterpart 64 may be disposed aft of the strut 26 and may be attached to the strut 26 via a trailing link 28.

In some embodiments of the aircraft takeoff assist system 38: the takeoff assist vehicle 12 may be an unmanned two-wheeled vehicle 12 having a first ground-engaging wheel 34 and a second ground-engaging wheel 36 arranged in tandem; and the vehicle coupling counterpart 62 may be disposed in tandem with the first and second ground-engaging wheels 34, 36 of the takeoff assist vehicle 12.

In some embodiments of the aircraft takeoff assist system 38: the first ground-engaging wheel 34 is disposed between the vehicle coupling counterpart 62 and the second ground-engaging wheel 36; and the takeoff assist vehicle 12 may include an electric motor 42 operatively connected to drive the first ground-engaging wheel 34.

The takeoff assist vehicle 12 may include a battery 40 operatively connected to supply electric power to one or more electric motors 42 configured to propel the takeoff assist vehicle 12, the battery 40 may be disposed between the first and second ground-engaging wheels 34, 36.

The takeoff assist vehicle 12 may include a flywheel 50.

The flywheel 50 may be disposed between the first and second ground-engaging wheels 34, 36.

In some embodiments of the aircraft takeoff assist system 38: the first ground-engaging wheel 34 may be disposed between the vehicle coupling counterpart 62 and the second ground-engaging wheel 36; and the first ground-engaging wheel 34 may be steerable.

The takeoff assist vehicle 12 may include a steering damper 90 associated with the first ground-engaging wheel 34.

The vehicle coupling counterpart 62 may be movably attached to the frame 88 of the takeoff assist vehicle 12.

The vehicle coupling counterpart 62 may be attached to a push link 30 movably attached to the frame 88 of the takeoff assist vehicle 12.

The takeoff assist vehicle 12 may include a damper (e.g., pad 96) operatively disposed between the push link 30 and the frame 88 of the takeoff assist vehicle 12.

A position of the second ground-engaging wheel 36 relative to the frame 88 of the takeoff assist vehicle 12 may be variable.

Embodiments of the aircraft takeoff assist system 38 may include combinations of the above features.

In another aspect, the disclosure describes an aircraft assist vehicle 12 comprising: a frame 88; ground-engaging wheels 34, 36 mounted to the frame 88; a power source (e.g., vehicle battery 40, vehicle motor 42) for driving one or more of the ground-engaging wheels 34, 36; and a vehicle coupling counterpart 62 for engagement with an aircraft coupling counterpart 64 of an aircraft 10 to define a swivel connection for transferring a propulsive force from the aircraft assist vehicle 12 to the aircraft 10, the vehicle coupling counterpart 62 including an upwardly tapered projection 68 having an electric port for transferring electric power from the aircraft assist vehicle 12 to the aircraft 10.

The projection 68 may have a conical shape.

The projection 68 may have a data port for transferring data between the aircraft assist vehicle 12 and the aircraft 10.

The ground-engaging wheels 34, 36 may consist of a first ground-engaging wheel 34 and a second ground-engaging wheel 36 arranged in tandem.

The vehicle coupling counterpart 62 may be disposed in tandem with the first and second ground-engaging wheels 34, 36.

Embodiments of the aircraft assist vehicle 12 may include combinations of the above features.

In another aspect, the disclosure describes a method 1000 of propelling an aircraft 10 with an assist vehicle 12 during a takeoff roll, the method 1000 comprising: with the assist vehicle 12 coupled to a landing gear 22 of the aircraft 10 and disposed aft of the landing gear 22, propelling the aircraft 10 with the assist vehicle 12 by transferring a propulsive force from the assist vehicle 12 to the aircraft 10 via the landing gear 22 during the takeoff roll; and after propelling the aircraft 10 with the assist vehicle 12 during the takeoff roll, decoupling the assist vehicle 12 from the landing gear 22 of the aircraft 10.

The assist vehicle 12 may be an unmanned two-wheeled motorcycle.

Decoupling the assist vehicle 12 from the landing gear 22 may include using upward movement of the landing gear 22 to automatically disengage the assist vehicle 12 from the landing gear 22.

The landing gear 22 may be a main landing gear 22 of the aircraft 10.

The assist vehicle 12 may be a first assist vehicle 12A coupled to a first strut 26A of the main landing gear 22 and the method 1000 may include: with a second assist vehicle 12B coupled to a second strut 26B of the main landing gear 22 of the aircraft 10 and disposed aft of the main landing gear 22, transferring the propulsive force from the first and second assist vehicles 12A, 12B to the aircraft 10 via the main landing gear 22 during the takeoff roll; and after propelling the aircraft 10 with the first and second assist vehicles 12A, 12B during the takeoff roll, decoupling the first and second assist vehicles 12A, 12B from the main landing gear 22 of the aircraft 10.

In some embodiments of the method 1000: the aircraft 10 may include one or more electric aircraft motors 14; and the method 1000 may include propelling the aircraft 10 with the one or more electric aircraft motors 14 when propelling the aircraft 10 with the assist vehicle 12.

The method 1000 may include transferring electric power from the assist vehicle 12 to the one or more electric aircraft motors 14 of the aircraft 10 when propelling the aircraft 10 with the assist vehicle 12.

The method 1000 may include transferring electric power from the assist vehicle 12 to the aircraft 10 when propelling the aircraft 10 with the assist vehicle 12.

The method 1000 may include powering one or more aircraft systems 20 using the electric power from the assist vehicle 12 when propelling the aircraft 10 with the assist vehicle 12.

The method 1000 may include: receiving data from the aircraft 10 at the assist vehicle 12 when propelling the aircraft 10 with the assist vehicle 12; and controlling the assist vehicle 12 based on the data received from the aircraft 10.

The method 1000 may include causing recuperative braking of the assist vehicle 12 after decoupling the assist vehicle 12 from the landing gear 22 of the aircraft 10 to energise a flywheel 50 of the assist vehicle 12.

Embodiments of the method 1000 may include combinations of the above features.

In another aspect, the disclosure describes a method 1000 of propelling an aircraft 10 on ground using a two-wheeled unmanned motorcycle 12, the method 1000 comprising: coupling the two-wheeled unmanned motorcycle 12 to a landing gear 22 of the aircraft 10; and propelling the aircraft 10 with the two-wheeled unmanned motorcycle 12 by transferring a propulsive force from the two-wheeled unmanned motorcycle 12 to the aircraft 10 via the landing gear 22 when the aircraft 10 is on ground.

The two-wheeled unmanned motorcycle 12 may be disposed aft of the landing gear 22 when the aircraft 10 is propelled by the two-wheeled unmanned motorcycle 12.

In some embodiments of the method 1000: the landing gear 22 may be a main landing gear 22 of the aircraft 10; the two-wheeled unmanned motorcycle 12 may be a first two-wheeled unmanned motorcycle 12A coupled to a first strut 26A of the main landing gear 22; and the method 1000 may include, with a second two-wheeled unmanned motorcycle 12B coupled to a second strut 26B of the main landing gear 22 of the aircraft 10, transferring the propulsive force from the first and second two-wheeled unmanned motorcycles 12A, 12B to the aircraft 10 via the main landing gear 22 when the aircraft 10 is on ground.

The method 1000 may include propelling the aircraft 10 with the two-wheeled unmanned motorcycle 12 during a takeoff roll of the aircraft 10.

The method 1000 may include transferring electric power from the two-wheeled unmanned motorcycle 12 to the aircraft 10 when propelling the aircraft 10 with the two-wheeled unmanned motorcycle 12.

Embodiments of the method 1000 may include combinations of the above features.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A two-wheeled aircraft assist motorcycle comprising:
a frame;
two ground-engaging wheels mounted to the frame and arranged in tandem;
a power source for driving one or both of the ground-engaging wheels; and
a vehicle coupling counterpart for engagement with an aircraft coupling counterpart of an aircraft to define a swivel connection for transferring a propulsive force from the two-wheeled aircraft assist motorcycle to the aircraft, the vehicle coupling counterpart including an upwardly tapered projection having an electric port for transferring electric power from the two-wheeled aircraft assist motorcycle to the aircraft.

2. The two-wheeled aircraft assist motorcycle as defined in claim 1, wherein the projection has a conical shape.

3. The two-wheeled aircraft assist motorcycle as defined in claim 2, wherein the projection has a data port for transferring data between the aircraft assist vehicle and the aircraft.

4. The two-wheeled aircraft assist motorcycle as defined in claim 1, wherein the vehicle coupling counterpart is disposed in tandem with the two ground-engaging wheels.

5. A method of propelling an aircraft with an assist vehicle during a takeoff roll, the method comprising:
with the assist vehicle coupled to a landing gear of the aircraft and disposed aft of the landing gear, propelling the aircraft with the assist vehicle by transferring a propulsive force from the assist vehicle to the aircraft via the landing gear during the takeoff roll; and
after propelling the aircraft with the assist vehicle during the takeoff roll, decoupling the assist vehicle from the landing gear of the aircraft,
wherein the assist vehicle is an unmanned two-wheeled motorcycle.

6. The method as defined in claim 5, wherein decoupling the assist vehicle from the landing gear includes using upward movement of the landing gear to automatically disengage the assist vehicle from the landing gear.

7. The method as defined in claim 5, wherein the landing gear is a main landing gear of the aircraft.

8. The method as defined in claim 7, wherein the assist vehicle is a first assist vehicle coupled to a first strut of the main landing gear and the method includes:
with a second assist vehicle coupled to a second strut of the main landing gear of the aircraft and disposed aft of the main landing gear, transferring the propulsive force from the first and second assist vehicles to the aircraft via the main landing gear during the takeoff roll; and
after propelling the aircraft with the first and second assist vehicles during the takeoff roll, decoupling the first and second assist vehicles from the main landing gear of the aircraft.

9. The method as defined in claim 5, wherein:
the aircraft includes one or more electric aircraft motors; and
the method includes propelling the aircraft with the one or more electric aircraft motors when propelling the aircraft with the assist vehicle.

10. The method as defined in claim 9, comprising transferring electric power from the assist vehicle to the one or more electric aircraft motors of the aircraft when propelling the aircraft with the assist vehicle.

11. The method as defined in claim 5, comprising transferring electric power from the assist vehicle to the aircraft when propelling the aircraft with the assist vehicle.

12. The method as defined in claim 11, comprising powering one or more aircraft systems using the electric power from the assist vehicle when propelling the aircraft with the assist vehicle.

13. The method as defined in claim 5, comprising:
receiving data from the aircraft at the assist vehicle when propelling the aircraft with the assist vehicle; and
controlling the assist vehicle based on the data received from the aircraft.

14. The method as defined in claim 5, comprising causing recuperative braking of the assist vehicle after decoupling the assist vehicle from the landing gear of the aircraft to energise a flywheel of the assist vehicle.

15. A method of propelling an aircraft on ground using a two-wheeled unmanned motorcycle, the method comprising:
coupling the two-wheeled unmanned motorcycle to a landing gear of the aircraft; and
propelling the aircraft with the two-wheeled unmanned motorcycle by transferring a propulsive force from the two-wheeled unmanned motorcycle to the aircraft via the landing gear when the aircraft is on ground.

16. The method as defined in claim 15, wherein the two-wheeled unmanned motorcycle is disposed aft of the landing gear when the aircraft is propelled by the two-wheeled unmanned motorcycle.

17. The method as defined in claim 15, wherein:
the landing gear is a main landing gear of the aircraft;
the two-wheeled unmanned motorcycle is a first two-wheeled unmanned motorcycle coupled to a first strut of the main landing gear; and
the method includes, with a second two-wheeled unmanned motorcycle coupled to a second strut of the main landing gear of the aircraft, transferring the propulsive force from the first and second two-wheeled unmanned motorcycles to the aircraft via the main landing gear when the aircraft is on ground.

18. The method as defined in claim 15, comprising propelling the aircraft with the two-wheeled unmanned motorcycle during a takeoff roll of the aircraft.

19. The method as defined in claim 15, comprising transferring electric power from the two-wheeled unmanned motorcycle to the aircraft when propelling the aircraft with the two-wheeled unmanned motorcycle.

\* \* \* \* \*